United States Patent
Brisebois et al.

(10) Patent No.: US 9,942,853 B2
(45) Date of Patent: *Apr. 10, 2018

(54) DATA BUNDLING AND FAST DORMANCY BASED UPON INTELLIGENT APPLICATION LEARNING

(71) Applicant: AT&T Mobility II LLC, Atlanta, GA (US)

(72) Inventors: Arthur Richard Brisebois, Cumming, GA (US); Yonghui Tong, Alpharetta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/484,195

(22) Filed: Apr. 11, 2017

(65) Prior Publication Data

US 2017/0223633 A1  Aug. 3, 2017

Related U.S. Application Data

(63) Continuation of application No. 14/858,405, filed on Sep. 18, 2015, now Pat. No. 9,655,166, which is a
(Continued)

(51) Int. Cl.
  *G06F 15/173* (2006.01)
  *H04W 52/02* (2009.01)
  (Continued)

(52) U.S. Cl.
  CPC ......... *H04W 52/0258* (2013.01); *H04L 29/06* (2013.01); *H04L 29/08072* (2013.01);
  (Continued)

(58) Field of Classification Search
  CPC .................... H04L 29/08072; H04L 29/06
  (Continued)

(56) References Cited

U.S. PATENT DOCUMENTS 8,060,054 B1  11/2011  Dinan et al.
8,060,154 B1  11/2011  Bali et al.
(Continued)

FOREIGN PATENT DOCUMENTS

EP  544462 A2  6/1993

OTHER PUBLICATIONS

Farrell et al, "When TCP Break Delay and Disruption-Tolerant Networking", Jul.-Aug. 2006, IEEE Computer Society 1089-7801/06, pp. 72-78.
(Continued)

*Primary Examiner* — Chris Parry
*Assistant Examiner* — Weiwei Stiltner
(74) *Attorney, Agent, or Firm* — Amin, Turocy & Watson, LLP

(57) ABSTRACT

Data bundling and fast dormancy controls are provided based on application monitoring and classification. Moreover, a balance is enabled between saving battery power of a user equipment (UE) and reducing signaling and processing load in a radio resource controller (RRC). For instance, a system can observe data flow related behavior of applications on the UE. On receiving a first data flow request, an arrival time of a next data flow request is predicted based on an analysis of the behavior, and the system determines whether the two data flows can be bundled together and transmitted over a single connection. Additionally, on completion of the first data flow, the arrival time of the next data flow request is predicted based on the analysis, and the system determines whether a fast dormancy timer can be disabled to transmit the next data flow over the current connection.

20 Claims, 13 Drawing Sheets

Related U.S. Application Data continuation of application No. 12/947,188, filed on Nov. 16, 2010, now Pat. No. 9,167,618.

(51) Int. Cl.

| | | |
|---|---|---|
| *H04W 4/00* | (2018.01) | |
| *H04W 76/06* | (2009.01) | |
| *H04W 28/08* | (2009.01) | |
| *H04L 29/08* | (2006.01) | |
| *H04L 29/06* | (2006.01) | |
| *H04W 76/04* | (2009.01) | |
| *H04W 88/12* | (2009.01) | |

(52) U.S. Cl.
CPC ........... *H04W 4/001* (2013.01); *H04W 28/08* (2013.01); *H04W 76/068* (2013.01); *H04W 76/046* (2013.01); *H04W 88/12* (2013.01)

(58) Field of Classification Search
USPC .................................................. 709/223–226
See application file for complete search history.

(56) References Cited

U.S. PATENT DOCUMENTS

| | | | |
|---|---|---|---|
| 8,537,674 | B2 | 9/2013 | Brisebois et al. |
| 2005/0265294 | A1 | 12/2005 | Hu et al. |
| 2007/0049239 | A1 | 3/2007 | Joung et al. |
| 2007/0058669 | A1 | 3/2007 | Hoffmann et al. |
| 2007/0168417 | A1 | 7/2007 | Swanburg et al. |
| 2008/0162637 | A1 | 7/2008 | Adamczyk et al. |
| 2009/0268672 | A1 | 10/2009 | Kline et al. |
| 2009/0279460 | A1 | 11/2009 | Sarkar |
| 2009/0323686 | A1 | 12/2009 | Dyck et al. |
| 2010/0036921 | A1 | 2/2010 | Ananthanarayanan et al. |
| 2010/0064353 | A1 | 3/2010 | Kan et al. |
| 2010/0118752 | A1 | 5/2010 | Suzuki et al. |
| 2010/0135326 | A1 | 6/2010 | Ray et al. |
| 2010/0281112 | A1 | 11/2010 | Plamondon |
| 2010/0281326 | A1 | 11/2010 | Ahn et al. |
| 2011/0038347 | A1 | 2/2011 | Patil et al. |
| 2011/0059742 | A1 | 3/2011 | Nakamura et al. |
| 2011/0116427 | A1 | 5/2011 | Chang et al. |
| 2011/0142039 | A1 | 6/2011 | Jung |
| 2011/0237273 | A1 | 9/2011 | Wigren et al. |
| 2011/0264663 | A1 | 10/2011 | Verkasalo |
| 2011/0292815 | A1 | 12/2011 | Baucke et al. |
| 2011/0307354 | A1 | 12/2011 | Erman et al. |
| 2011/0317631 | A1 | 12/2011 | Navda et al. |
| 2011/0319064 | A1 | 12/2011 | Lenart et al. |
| 2012/0005351 | A1 | 1/2012 | Dhesikan et al. |
| 2012/0192258 | A1 | 7/2012 | Spencer et al. |

OTHER PUBLICATIONS

Burleigh et al, "Delay-Tolerant Networking: An Approach to Interplanetary Internet", Jun. 2003, IEEE Commuications Maganize, 0163-6804/03, pp. 128-136.

Office Action dated Dec. 13, 2012 for U.S. Appl. No. 12/947,188, 40 pages.

Office Action dated May 22, 2013 for U.S. Appl. No. 12/947,188, 39 pages.

Office Action dated Nov. 4, 2013 for U.S. Appl. No. 12/947,188, 42 pages.

Office Action dated Jun. 3, 2014 for U.S. Appl. No. 12/947,188, 51 pages.

Office Action dated Jan. 5, 2015 for U.S. Appl. No. 12/947,188, 34 pages.

DATA BUNDLING AND FAST DORMANCY BASED UPON INTELLIGENT APPLICATION LEARNING

CROSS-REFERENCE TO RELATED APPLICATIONS

This application is a continuation of, and claims priority to each of, U.S. patent application Ser. No. 14/858,405 (now U.S. Pat. No. 9,655,166), filed on Sep. 18, 2015, entitled "DATA BUNDLING AND FAST DORMANCY BASED UPON INTELLIGENT APPLICATION LEARNING", which is a continuation of U.S. patent application Ser. No. 12/947,188 (now U.S. Pat. No. 9,167,618), filed on Nov. 16, 2010, entitled "DATA BUNDLING AND FAST DORMANCY BASED UPON INTELLIGENT APPLICATION LEARNING". The entireties of the foregoing applications are hereby incorporated by reference herein.

TECHNICAL FIELD

The subject disclosure relates to wireless communications and, more particularly, to a mechanism that facilitates data bundling and fast dormancy based on intelligent learning and characterization of applications employed by a user equipment (UE), to reduce network signaling in the communication network.

BACKGROUND

Universal Mobile Telecommunications System (UMTS) networks have seen an explosive data growth in past few years and, in future, are expected to see continuing growth in the Packet Switched (PS) domain. Beyond data traffic volume growth, an even more aggressive growth in data signaling load has been detected. Among all the signaling messages/procedures on UMTS networks, Radio Access Network (RAN) signaling procedures have caused the most growth and impact. This is due to complicated radio resource sharing techniques required to conserve resources occupied by various users and services.

The majority of RAN signaling events are for connection setup and state transitions (e.g., during Channel Switching). Typically, when a data payload is to be sent from/received by a user equipment (UE), a request is sent to a radio network controller (RNC) to establish a dedicated channel (DCH). Once the data payload is sent or received, multiple inactivity timers are triggered by the RNC and upon expiration of the timers, the RNC transitions the UE from DCH to forward access channel (FACH) and then to IDLE state. To achieve resource efficiency, such timers are often set to short values (cumulatively around 12-16 seconds). Thus, the UE is quickly moved into the IDLE state after completion of a current data session (download and/or upload). Since there is no active data connection between the UE and the core network during the IDLE state, power consumption is minimized. Data applications on the UE initiate multiple data payloads for communication between the UE and RNC. However, the applications operate independently from the radio network perspective, which leads to requesting and establishing multiple independent connections for payloads from different applications. As a result, even though battery life of the UE is conserved, a large number of signaling events are generated and RNC processing load is substantially increased.

In addition to network initiated inactivity-based state transition, UE manufacturers have introduced a fast dormancy (FD) feature that initiates direct transition from DCH to IDLE or FACH to IDLE, before the respective network inactivity timer expires. In this type of system control, the UE proactively releases the data connection, established by the RNC, directly from DCH to IDLE or FACH to IDLE as quickly as possible, to further conserve UE battery life. However, once the UE is in the IDLE state, the data connection must be reestablished to communicate another payload. The reestablishment of the data connection is resource intensive, consumes a high amount of power in the RNC, and can significantly drive up the RNC load.

DETAILED DESCRIPTION

Figure 1:
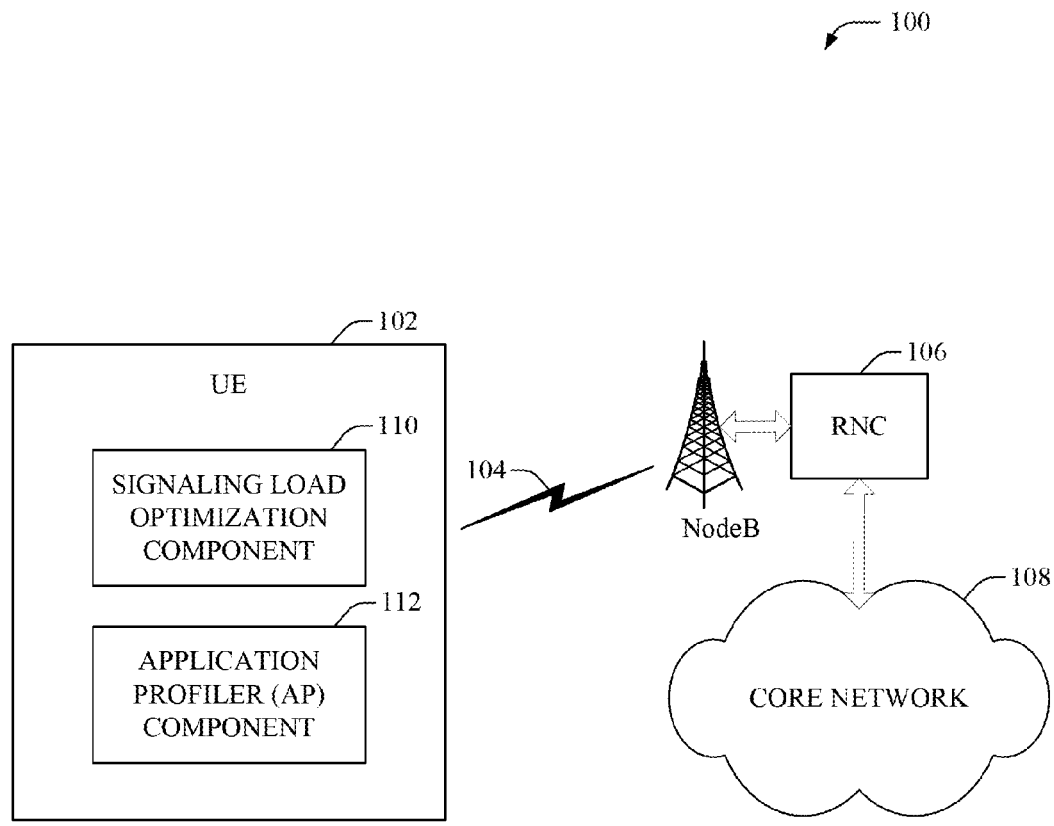
FIG. 1 illustrates an example system that facilitates signaling load optimization in a communication network.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "engine," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "data flow," "data session," and the like are also employed interchangeably throughout the subject specification, unless context warrants particular distinction(s) among the terms.

The systems and methods disclosed herein, in one aspect thereof, can facilitate bundling data sessions and controlling fast dormancy based on learning and characterization of different applications on a user equipment (UE), through historic data tracking and analysis. As an application starts to generate data flows, the system tracks the characteristics of the application and builds a histogram for various application characteristics, such as, but not limited to, inter-packet arrival time, frequency of use, packet size, session duration, delay tolerance level etc. Moreover, the system includes an application profiler (AP) engine that can predict arrival time of data flows from multiple applications (downlink or uplink) based on history building and statistical analysis of the tracked characteristics. Based on the arrival time, the AP engine can determine if the current data flow can be delayed and bundled with one or more next data flows, as well as determine whether a fast dormancy timer can be delayed on completion of the current data flow.

According to an aspect, the system, via enabling data bundling and controlling fast dormancy, reduces the number of radio resource control (RRC) connection establishments (as part of data connection setup) and thus minimizes Radio network controller (RNC) processing load and call setup time (latency). Moreover, the system can bundle closely spaced data payloads and stack data packets from one or more applications in one single connection. This results in decreased number of signaling events and reduces RNC processing load. Further, by temporarily disabling fast dormancy the system can avoid unnecessary and pre-mature data connection releases (and corresponding new data connection setups).

Another aspect of the disclosed subject matter relates to a method that can be employed to facilitate data bundling and fast dormancy based on observing application behavior in a UE. The method comprises monitoring data applications installed/downloaded on the UE, and generating an application profile for each application. Further, the application profiles can be analyzed and the applications can be categorized, for example, as "random," "delay tolerant," and/or "not delay tolerant," etc. Furthermore, the method includes identifying an arrival time of a next data flow based on statistical analysis. Moreover, it can be determined whether the current data flow can be bundled with the next data flow based on the arrival time and/or the categorization. In addition, the arrival time can also be employed to determine whether a fast dormancy timer can be delayed.

The systems and methods disclosed herein reduce network signaling load, and shorten user perceived latency with minimum loss on battery life of a user equipment (UE). Moreover, the disclosed systems and methods perform data bundling and/or fast dormancy based on intelligent learning and characterization of applications on the UE. Specifically, the UE monitors and profiles application activity and tunes data bundling and/or fast dormancy techniques accordingly, as explained in detail infra.

Aspects, features, or advantages of the subject innovation can be exploited in substantially any wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that facilitates signaling load optimization in a communication network, according to an aspect of the subject specification. Moreover, system 100 performs data bundling and fast dormancy based on intelligent learning and characterization of applications by a user equipment (UE) 102, to reduce network signaling 104 with a Radio Network Controller (RNC) 106. Typically, the core network 108 can include a UMTS network; however, it can be appreciated that the subject innovation is not so limited and most any communication network can be utilized. The core network 108 can be connected to various backbone networks (not shown) for example, the Internet, Integrated Services Digital Network (ISDN), etc.

Typically, UE 102 can include most any electronic communication device such as, but not limited to, most any consumer electronic device, for example, a digital media player, a digital photo frame, a digital camera, a cellular phone, a personal computer, a personal digital assistant (PDA), a smart phone, a laptop, a gaming system, etc. Further, UE 102 can also include LTE based devices, such as, but not limited to, most any home or commercial appliance that includes an LTE radio. It can be appreciated that the UE 102 can be mobile, have limited mobility and/or be stationary.

Typically, when data is communicated between the UE 102 and the core network 108, the UE 102 sends request to the RNC 106, requesting resources to establish a connection. Once the data payload is sent or received, the RNC 106 activates multiple inactivity timers, which facilitate channel switching at the UE 102. In one example, upon expiration of the timers, the UE 102 can transition from dedicated channel (DCH) to Forward Access Channel (FACH) to IDLE state. Oftentimes, the inactivity timers are set to short values (e.g., cumulatively around 12-16 seconds) to achieve resource efficiency. The short values enable the UE 102 to quickly move to IDLE state after completion of current data session (download or upload).

In addition to network initiated inactivity-based state transition, the UE 102 can also perform fast dormancy (FD) to initiate direct transition from DCH to IDLE or FACH to IDLE, before network inactivity timer expires. The FD feature in the UE 102 reduces power consumption in the UE 102, by transitioning the UE 102 to the IDLE mode and releasing the connection as quickly as possible. In traditional systems, when more data is expected after the UE 102 releases the connection, the connection needs to be reestablished, which can significantly increase the RNC load. However, according to an embodiment of the subject system, UE 102 includes a signaling load optimization component 110 that identifies such cases (e.g., when data communication is expected) and deactivates the FD mechanism and/or performs data bundling for closely spaced sequential data sessions.

Typically, a user can download and utilize various applications on UE 102. These applications operate independently from the radio network perspective and independently establish different connections with the RNC to communicate data payloads. In one aspect, UE 102 can employ signaling load optimization component 110 to bundle closely spaced data payloads. Moreover, the signaling load optimization component 110 can ensure that small data packets are stacked together and sent in a single connection, rather than individually via multiple connections. As a result, substantial amount of signaling can be reduced and the RNC processing load can be decreased significantly.

The UE 102 can further include an Application Profiler (AP) component 112, which can generate profiles for applications on the UE 102. The AP component 112 can monitor activity and track characteristics associated with each application that generates an outgoing data flow request and/or receives an incoming data flow request from the network 108. Moreover, the AP component 112 can predict if and/or when a new data flow request will be initiated by observing data flow related characteristics of the applications, forecasting trends and/or identifying probabilities for the new data flow request. Based on the prediction, the signaling load optimization component 110 can determine whether to bundle data payloads from one or more applications and send the bundled data payloads as one data transmission. Further, the signaling load optimization component 110 can identify whether fast dormancy can be disabled/delayed at the end of a given data flow transmission (e.g., due to a prediction that a new data flow request will be initiated shortly).

Real network study has shown that the RNC processor load related to channel switching and data connection setup, e.g., radio resource control (RRC)/radio access bearer (RAB) setup, together can be as high as 70% of the total RNC processor load. Further, study shows that RRC connection establishment (as part of data connection setup) involves multiple signaling handshake messages, not only increasing RNC processing load but also increasing prolong call setup time (latency). Conventional systems employ static state transition timers at RNC level, for all UEs served by the RNC, regardless of the UE type, applications running on these UEs and/or User interactions/awareness of these applications. In contrast, system 100 provides UEs (e.g., UE 102) that can intelligently bundle delay-tolerant data to reduce signaling load and disable/delay FD for situations with high likelihood of close spaced data sessions to reduce signaling load, as well as shorten call setup time. In addition, system 100 can also improve performance and extend battery life of UE 102. Typically, when a new bearer/connection is set up by the UE 102, a ramp-up interval occurs initially, wherein conservative and inefficient attributes produce suboptimal performance for some time at the beginning of a data flow. With bundling, the number of bearer activations are reduced and proportionally less time is spent in ramp-up; thus leading to improved performance and battery life of UE 102.

Figure 2:
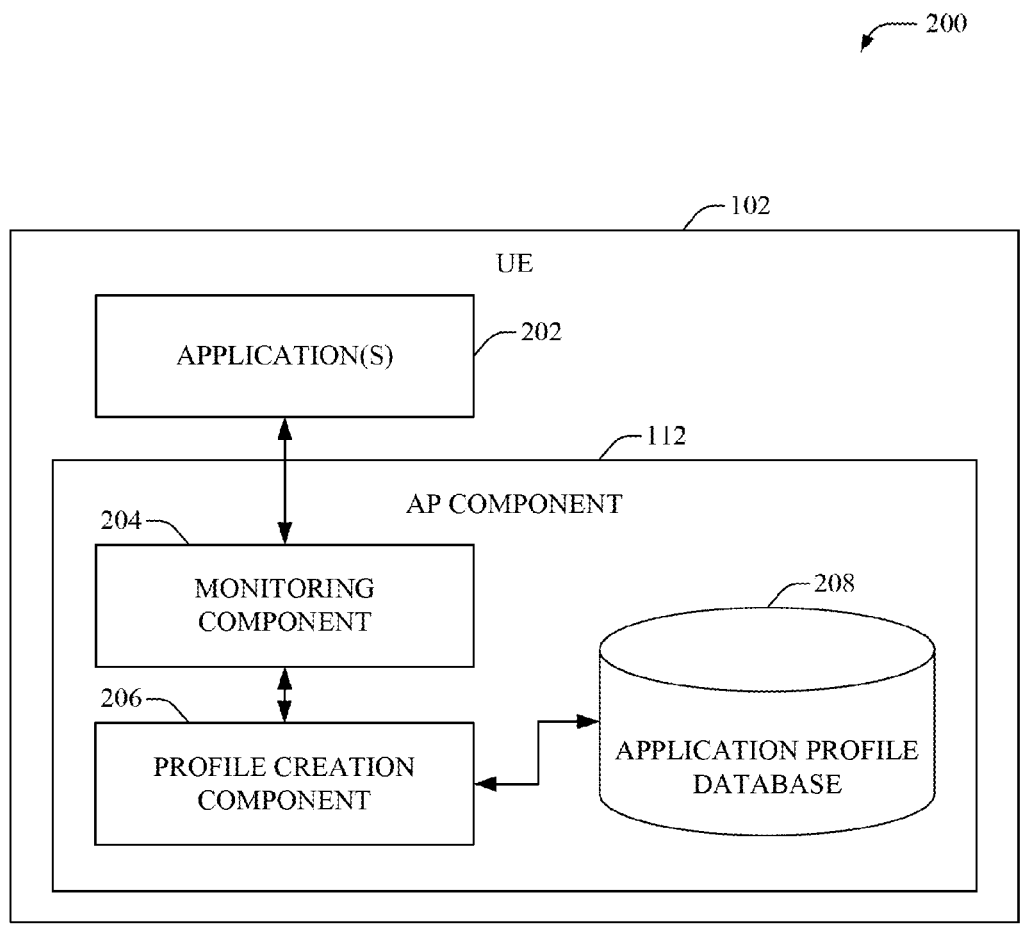
FIG. 2 illustrates an example system that can be employed for creating application profiles in a user equipment (UE).

Referring to FIG. 2, there illustrated is an example system 200 that can be employed for creating application profiles in a UE 102 in accordance with an aspect of the subject disclosure. It can be appreciated that the UE 102 and the AP component 112 can include functionality, as more fully described herein, for example, with regard to system 100. As discussed supra, in one example, the UE 102 can be connected to the mobile core network through a wireless radio access network, such as, but not limited to UMTS Terrestrial Radio Access Network (UTRAN). Moreover, the UE 102 can include most any mobile and/or stationary, wireless and/or wired, electronic communication device (e.g., cell phone, PDA, tablet, PC, laptop, etc.).

Application(s) 202 can include most any computer program(s), function(s) and/or instruction(s) to perform an activity, action, and/or task associated with UE 102. Typically, application(s) 202 can be pre-installed on UE 102 during manufacture, downloaded by customers from app stores and/or other mobile software distribution platforms, and/or provided by a service provider on service activation or at most any other time. Moreover, application(s) 202 can include data application(s) related to various fields, such as, but not limited to, business, entertainment, finance, games, health and fitness, maps and navigation, music or radio, news and weather, productivity, ringtones, wallpapers, skins and themes, social networking, sports and recreation, travel, utilities, etc. For example, application(s) 202 can include an application that enables users to surf the Internet, blog, access social networking websites, listen to radio stations, and/or play simple to complex games. In another example, a location application can determine a location of the user, a friend or provide turn-by-turn instruction for navigation. In yet another example, a medical application can be used to record/track a user's vital signs (e.g., heart rate) over a period of time and send them to a doctor for review.

In one aspect, monitoring component 204 can tack data flows associated with each application 202. In particular, monitoring component 204 can identify characteristics of the application(s) 202 and perform statistical analysis, for example, build a histogram, for various features associated with an application, such as, but not limited to, inter-packet arrival time, frequency of use, packet size, session duration, delay tolerance level etc. In one example, when an application is installed and/or downloaded, information associated with the characteristics of the application can be received by the monitoring component 204 from the application itself, and/or queried by the monitoring component 204 from another entity, for example, a network server or web server. In another example, monitoring component 204 can monitor, track and/or record behavior (e.g., inter-packet arrival time, frequency of use, packet size, session duration, delay tolerance level etc.) associated with an application over a period of time.

Further, the AP component 112 can include a profile creation component 206 that can analyze data monitored by monitoring component 204 to generate a profile for each application(s) 202. Moreover, a profile can include one or more profile keys that describe the behavior of the application with respect to data flows. Typically, more an application is utilized, more accurate the learning (e.g., by monitoring component 204) and profiling (e.g., by profile creation component 206) for such application will be. In one aspect, the by monitoring component 204 and profile creation component 206 can concurrently track, learn and build profiles for all applications that generate an outgoing data flow request and receive a incoming data flow request from network. The profile creation component 206 can store the profiles in an application profile database 208. Moreover, on learning or monitoring (e.g., by monitoring component 204) new information associated with an application, the profile creation component 206 can update and/or modify the application's profile stored in the application profile database 208. Further, profile creation component 206 can delete a profile associated with an application from the application profile database 208, if the application is deleted or uninstalled.

Additionally, the profile creation component 206 can employ most any machine learning/artificial intelligence technique and develop a statistically satisfactory prediction module for a set of applications 202. A set of applications can be marked as random due to their randomness of data flows, and will not be included in final decision for optimization of signaling load. In one example, UE 102 can be employed to operate as a mobile hotspot and can communicate with one or more tethered devices. In this example scenario, data flows to/from the tethered devices can also be marked as "random" and generally not included to identify whether data bundling is to be performed and/or FD is to be delayed.

Typically, the application profile database 208 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases, caches) of the subject systems and methods is intended to comprise, without being limited to, these and any other suitable types of memory.

Figure 3:
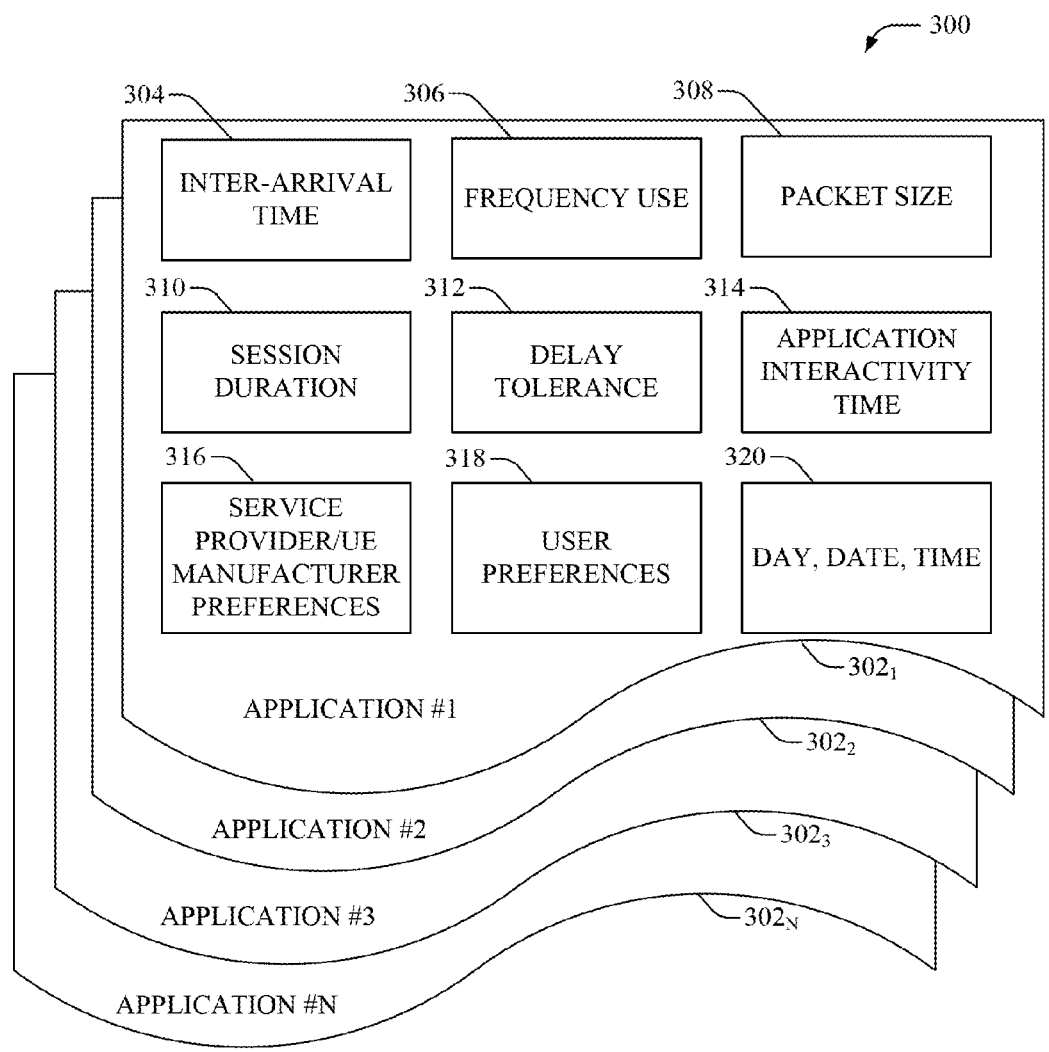
FIG. 3 illustrates are example profiles created by observing and/or receiving information associated with data applications on a UE.

Referring now to FIG. 3, there illustrated are example profiles 300 created by observing and/or receiving data associated with applications on a UE, according to an aspect of the subject disclosure. Typically, profiles $302_{1-N}$ can be created/updated by profile creation component 206 and stored in application profile database 208, which are more fully described herein, for example, with regard to system 200. It can be appreciated that most any number "N" of application profiles corresponding to applications on the UE can be created and stored (where N is a natural number from one to infinity). Further, it can be appreciated that although nine profile keys (304-320) are depicted in each profile of FIG. 3, the profiles $302_{1-N}$ can include greater or fewer number of profile keys.

In one aspect, a profile key (304-320) can be most any parameter or characteristic of an application with respect to data sessions/flows to and/or from the communication network. As an example, Inter-arrival time (I) 304 can be measured by observing the interval between one data flow request and the next data flow request, associated with an application (e.g., the data flow request can be initiated by the application or the network). Typically, the last interval, the last X number of intervals (e.g., X is most any natural number), average of the intervals, etc. can be stored in the in the profile. Further, Frequency Use (F) 306 can be indicative of the usage intensity of the application. For example, how often is the application generating a data flow request, regardless of the request being initiated by network or by the UE itself. Furthermore, Packet Size (P) 308 can provide information indicative of the size of a payload sent/received during a data flow. For example, the number of bytes of payload that are sent/received for each data flow, an average number of bytes of payload are sent/received during data flows, and/or number of bytes sent/received based on a type of data flow, etc., can be stored in the profile. Typically, this data can be used to predict when the transmission will be completed, if session duration data is incomplete and/or missing.

Additionally or alternately, Session duration (S) 310 can indicate how long each data flow transmission will last, from a first byte of payload to a last byte of payload transmission. Further, Delay tolerance (D) 312 can indicate whether or not the application can tolerant delay and can also specify how many seconds of delay it will allow without compromising service quality or user satisfaction. As an example, the delay tolerance 312 can be determined by measuring how often the user interacts with the application (e.g., pressing a button related to the application, responding to a prompt of the application, having audio or video played—which can indicate that the user is listening or viewing, etc.). For instance, web browsing with Web Search Application (App) will likely be profiled as less delay tolerant app than Social Networking App (when the Social Networking App is not opened by user).

Furthermore, Application Interactivity time (IT) 314 can also be stored within a profile $302_{1-N}$. Moreover, the Application Interactivity time indicates how soon after data reception, does the user utilize/interact with the data. For example, if a user typically puts the pertinent application in the foreground soon after data reception then the application can be considered less delay tolerant. In another example, if the user never opens the application within 15 minutes of incoming data receipt then the application can be considered as delay tolerant (e.g., with 15 second delay). In one aspect, once applications $302_{1-N}$ have been flagged as delay tolerant, their continued use may be used to identify an Average Interactivity Time for delay tolerant applications. Average Interactivity Time for delay tolerant applications can be used to identify an optimal bundling interval. For example, if a delay tolerant application is rarely opened within 15 minutes of data reception then the risk of 15-minute bundling intervals is relatively low.

In yet another aspect, service provider, UE manufacturer and/or application creator's/developer's preferences 316 can also be identified (e.g., during provisioning) and stored in a profile $302_{1-N}$. Further, the profile $302_{1-N}$ can store user preferences 318, defined by a user, for example, a UE owner. In one aspect, the user can define user preferences 318 during an initial setup phase, for example, when the application is installed. However, it can be appreciated that the service provider, UE manufacturer and/or application creator's preferences 316 and/or user preferences 306 can be updated, defined and/or deleted at most any time. With the above profile keys 304-320, and the time of the day (T) and date or day of the week (W) 320, the Profile (P) of a given application (e.g., $i^{th}$ application, wherein i is any natural number from one to infinity) can be defined as: Pi=ƒ(Ii, Fi, Pi, Si, Di, T, W). It can be appreciated that the profile can be a function of a subset of the above listed profile keys and/or can be a function of most any additional profile keys, which indicate data employed to predict optimization of signaling load.

Figure 4:
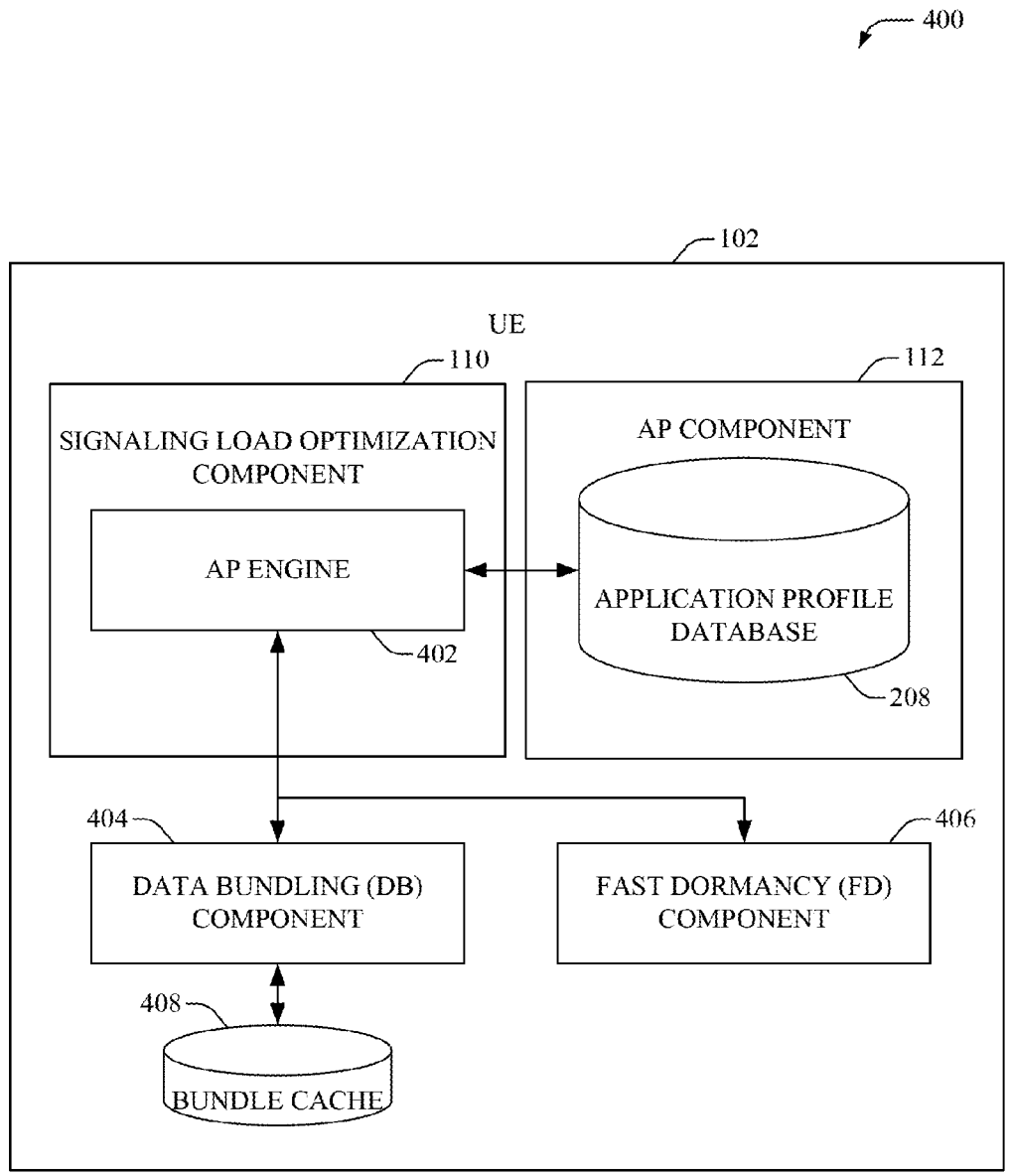
FIG. 4 illustrates an example system that facilitates data bundling and fast dormancy based upon intelligent application learning.

FIG. 4 illustrates an example system 400 that facilitates data bundling and fast dormancy based upon intelligent application learning, according to an aspect of the subject innovation. Specifically, system 400 performs intelligent learning and characterization of applications on the UE 102, to reduce network signaling in the communication network (e.g., UMTS). Application activity is monitored and profiled over time and data bundling and/or fast dormancy techniques are tuned to suit. Moreover, UE 102, signaling load optimization component 110, AP component 112, and the application profile database 208 can include functionality, as more fully described herein, for example, with regard to systems 100 and 200.

Typically, the signaling load optimization component 110 can include an AP engine 402 that is utilized to identify whether data flows should be bundled together, and/or whether fast dormancy should be disabled. In one aspect, the AP engine can analyze profile data (e.g., stored in application profile database 208) associated with an application to classify the application. For example, applications can be classified as random, delay tolerant, low delay tolerant, etc. Typically, applications classified as random, e.g., due to their randomness of data flows, are not included in final decision for data bundling and/or FD. According to an aspect, the AP engine 402 can predict when a new data flow will be initiated, based on an analysis (e.g., mathematical/statistical) of profile data and/or machine learning techniques. Further, the AP engine 402 can employ the analysis and/or classification data to determine whether or not to hold (delay) transmission of a data flow request, based on prediction of when a new data flow request will be initiated (e.g., so they can be bundled together and be sent as one data transmission). For example, if the AP engine 402 can identify a first data flow as delay tolerant and determine that a new data flow will be initiated shortly. In this example scenario, a data bundling (DB) component 404 can be employed to delay the first data flow and bundle the first and second data flows. Moreover, the DB component 404 can store the first data flow request in a bundle cache 408, until the second data flow request is initiated/received. If the prediction is incorrect and the second data flow request does not arrive within the expected delay, the first data flow can be sent/received, for example, on expiration of a bundling timer. Further, the AP engine 402 can also identify whether the fast dormancy mechanism performed by a fast dormancy (FD) component 406 can be disabled at the end of a data flow transmission (e.g., due to forecast of new data flow request shortly).

According to an embodiment, the AP engine 402 can predict and/or calculate, for an $i^{th}$ application (wherein i is any natural number from one to infinity), arrival time (Ai) of a next data flow based on the start time of last data flow (Ai−1) and profile Pi. Thus, Ai=ƒ(Pi, Ai−1). Moreover, the AP engine 402 can simultaneously and/or concurrently calculate a value 'A' for each application active in background or foreground, and generate a comprehensive view of a possibility (or likelihood) of concurrence of data flow request from multiple applications, and/or a possibility (or likelihood) and duration of overlapping of data flow requests from multiple applications. Based on the foregoing, the AP engine 402 can instruct the DB component 404 to whether or not to delay transmissions (bundle), and/or the FD component 406 to hold/disable a FD trigger, which transitions the UE 102 into an IDLE state.

In general, the AP engine 402 does not apply bundling or FD hold for low delay tolerant applications. For example, the AP engine 402 can simply generate an invalid input (e.g., such as negative infinite number) for Pi, so no valid output can be derived for the low delay tolerant application, leading to no decision (e.g., the DB component 404 and/or the FD component 406 can follow default handling: send data flow request out immediately). It can be appreciated that user input can override the results generated by the AP engine 402. Moreover, the AP engine can receive a copy of what a User Interface (UI) function module (not shown) receives and communicate internally at most any time. This can ensure user perceived latency is kept at the same level as if no bundling is in use.

Figure 5:
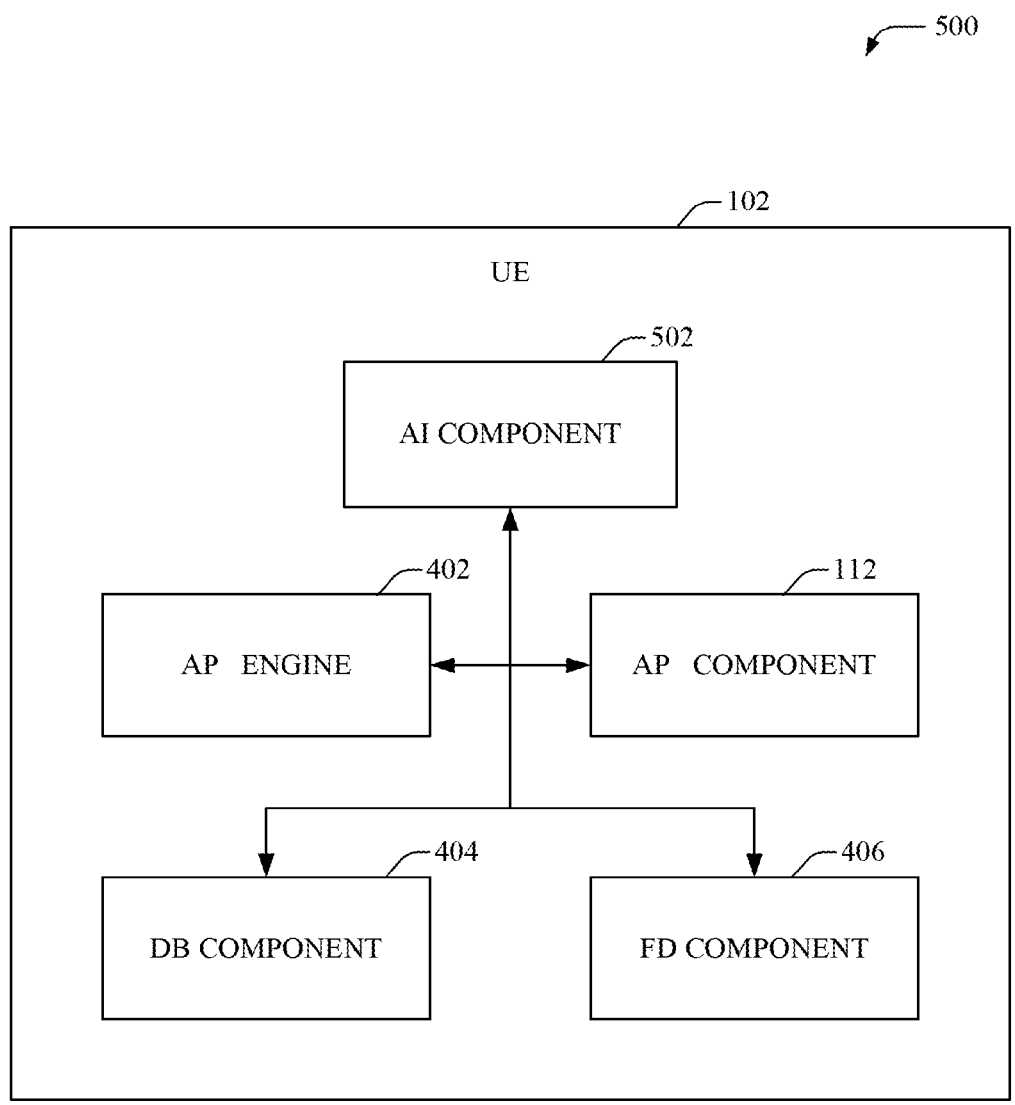
FIG. 5 illustrates an example system that facilitates automating one or more features in accordance with the subject innovation.

FIG. 5 illustrates an example system 500 that employs an artificial intelligence (AI) component 502, which facilitates automating one or more features in accordance with the subject innovation. It can be appreciated that the UE 102, AP component 112, AP engine 402, DB component 404, and FD component 406 can include respective functionality, as more fully described herein, for example, with regard to systems 100, 200, and 400.

The subject innovation (e.g., in connection with predicting arrival time, creating profiles, classifying applications, bundling data flows or applying FD hold) can employ various AI-based schemes for carrying out various aspects thereof. For example, a process for determining whether to delay a data transmission for bundling and/or disable a FD mechanism can be facilitated via an automatic classifier system and process. Moreover, the classifier can be employed to determine an arrival time of a next data flow, generate an application profile, classify applications, identify when bundling or FD hold is to be applied, etc.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information (e.g., profile keys) stored in application profile database 208 and the classes can be categories or areas of interest (e.g., levels of priorities, classification of applications, etc.).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing UE behavior, user interaction, application behavior/activity, application characteristics, receiving extrinsic information, etc.). For example, SVM's are configured via a learning or training phase within a classifier constructor and feature selection module. Thus, the classifier(s) can be used to automatically learn and perform a number of functions, including but not limited to determining according to a predetermined criteria when data flows from multiple application can be delayed and bundled together in one transmission, when a FD mechanism can be disabled, how a profile for an application can be populated, how can application can be classified, etc. The criteria can include, but is not limited to, historical patterns, UE behavior, user preferences, application creator preferences, service provider preferences and/or policies, UE device parameters, profile keys, location of the UE, etc.

Figure 6:
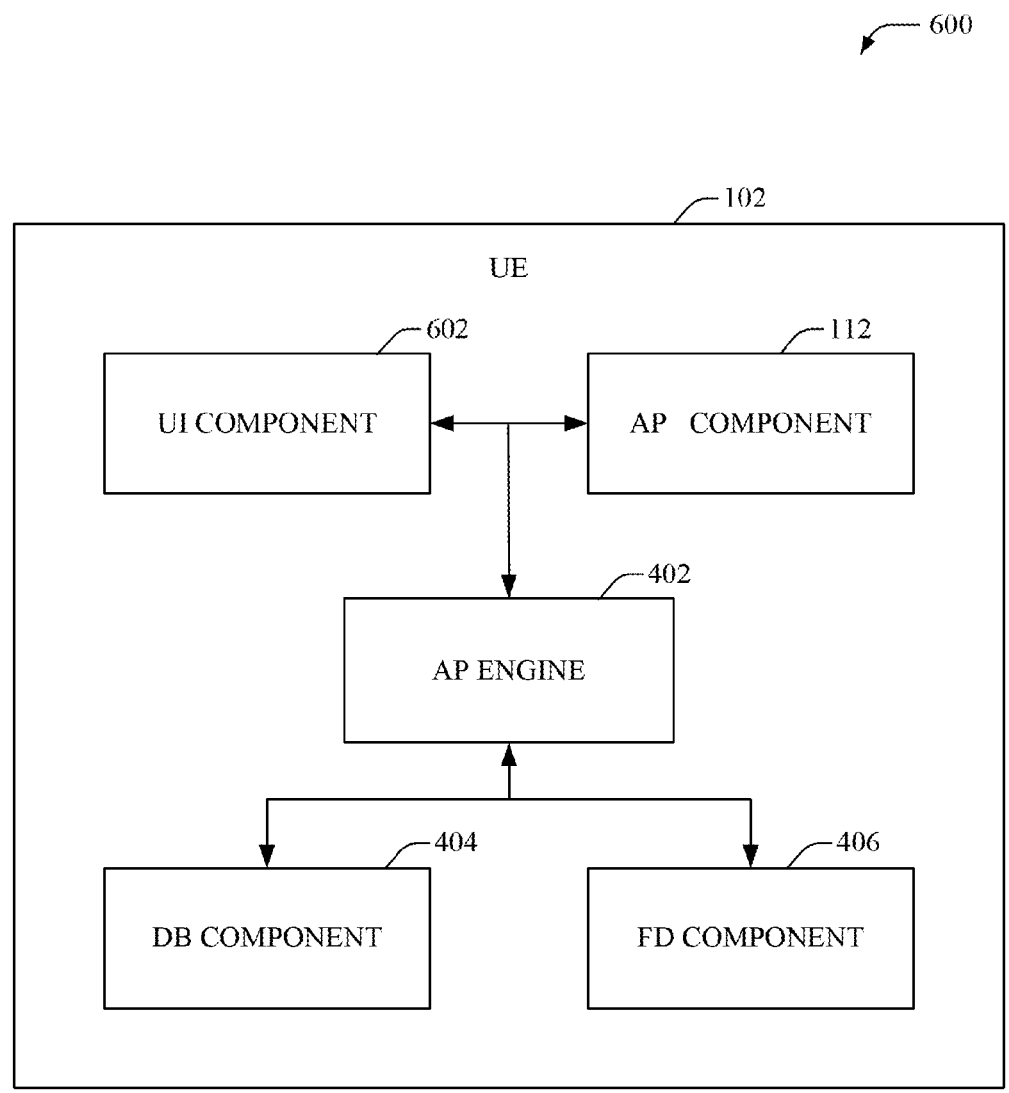
FIG. 6 illustrates an example system that facilitates data bundling and fast dormancy based on user interactivity.

FIG. 6 illustrates an example system 600 that facilitates data bundling and FD based on user interactivity (UI), according to an aspect of the subject innovation. Moreover, system 600 utilizes multiple user interaction indicators to identify data sessions with low "user awareness sensitivity" (e.g., user is not actively interactive with device) and bundles the identified data sessions together, thus avoiding multiple single data connections. Further, FD is avoided when high "user awareness sensitivity" is detected; thus avoiding unnecessary and/or pre-mature data connection releases and corresponding new data connection setups. It can be appreciated that the UE 102, AP component 112, AP engine 402, DB component 404, and FD component 406 can include respective functionality, as more fully described herein, for example, with regard to systems 100, 200, 400, and 500.

UE 102 can include a UI component 602 that can be employed to monitor user input and/or data flow requests. Typically, the UI component 602 can detect time correlations and/or gaps and provide information associated with the UI to the AP engine 402. In addition to classification based on delay tolerance, the AP engine 402 can also categorize and treat each data flow request according to "interactivity", for example, by considering the user input that preceded it. As an example, if a data flow request closely follows user input it can be considered "interactive". In another example, if audio or video playback is in progress the associated data application can be considered "interactive". Alternately, if a data flow request does not follow user input closely or does not include audio or video playback it can be considered "non-interactive".

According to an aspect, if a data flow request is initiated more than "X" (wherein X can be most any predefined or dynamically adjusted positive rational number) seconds after last user input, the large time distance (X) between user input and the start of the data flow is an indication that the user is not interacting with the device, not waiting for the data and/or not likely to request anything else soon. In this exemplary case, the AP engine 402 can instruct the DB component 404 to hold the outgoing data request in a bundle cache (e.g., 408) until a bundling timer expires. Typically, the bundling timer can provide a fixed and/or dynamic delay, which can be adjusted automatically according to load measurements. After the bundling timer has expired, the DB component 404 can initiate a data flow, process all bundled requests together, and terminate the data flow using fast dormancy immediately after the bundle cache is empty. The bundle cache can also be emptied by various other events, such as, but not limited to, a voice call and/or user input, that trigger data flows to begin before the bundling timer has expired. Some applications shall run in the background without requiring user inputs (e.g., internet radio application). The AP engine 402 can classify these applications in certain conditions as "high awareness applications" (e.g., Interactive) which will be excluded from bundling.

In addition, based on the interactivity data from the UI component 602, the AP engine 402 can disable FD by the FD component 406. For example, if a user input occurred less than "X" seconds (wherein X can be most any predefined or dynamically adjusted positive rational number) before the data flow request is made; the AP engine 402 can classify this data flow request as "interactive" and accordingly disable FD.

In one aspect, the DB component 404 can also utilize network radio load indications, such as, but not limited to, downlink Ec/Io (ratio of received pilot energy, Ec, to total received energy or the total power spectral density, Io) and/or a current uplink interference level (SIB7), to dynamically determine and/or scale the bundling delay ($T_b$). For example, if Ec/Io and/or SIB 7 uplink noise are poor, the value of bundling timer ($T_b$) can be increased, to reduce additional loading impact. However, if Ec/Io and/or SIB 7 uplink noise are optimal, the value of bundling timer ($T_b$) can be decreased (e.g., bundling is not performed, or bundling is performed for a very short interval).

Figure 7:
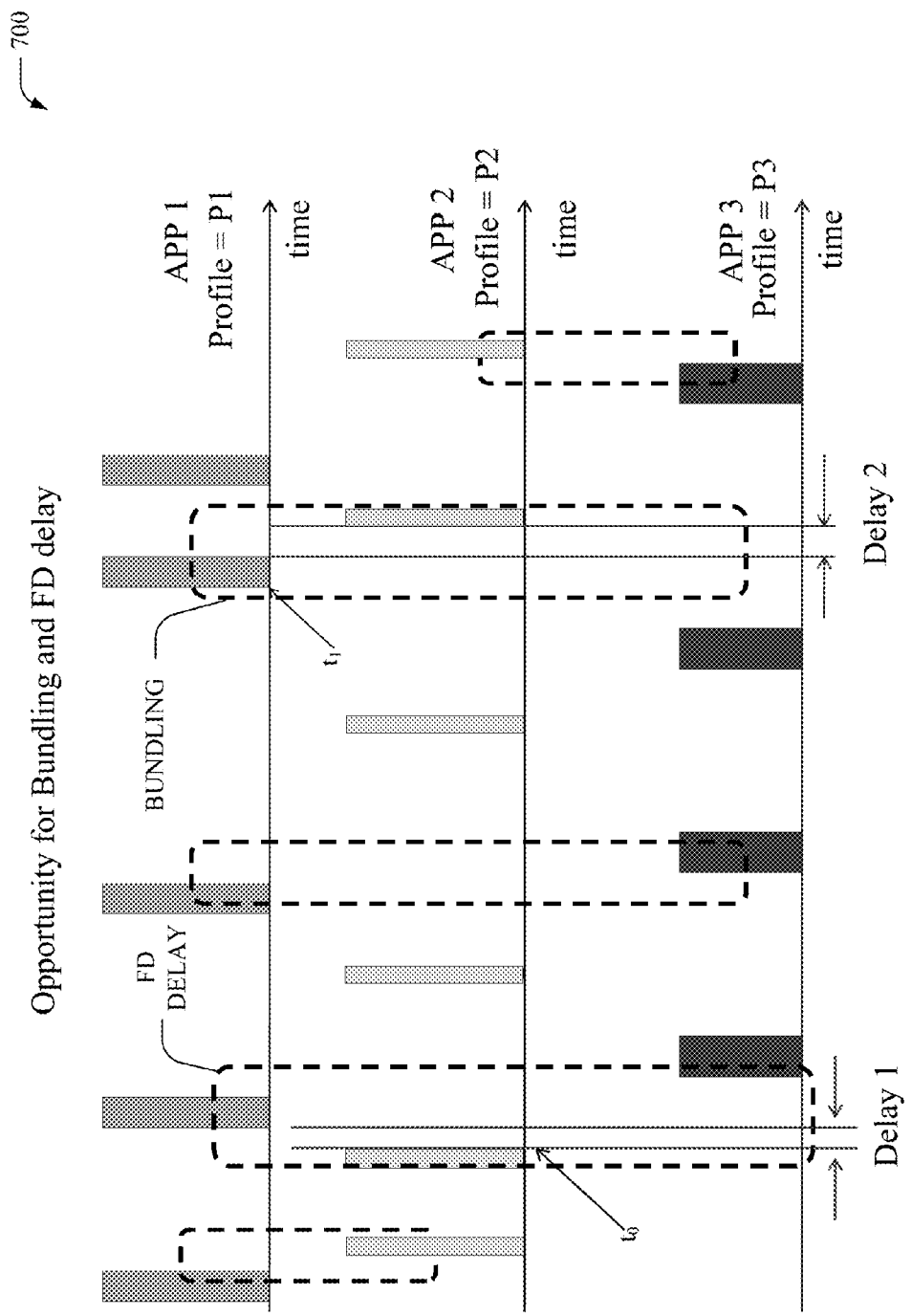
FIG. 7 illustrates an example timeline that depicts when an application profiler (AP) engine can perform data bundling and/or can disable fast dormancy.

Referring to FIG. 7, there illustrated is an example timeline 700 that depicts when the AP engine 402 can perform data bundling and/or can disable fast dormancy. Each bar in FIG. 7 can represent a unique data session of the different applications (APP1-APP3). Although only three applications are illustrated, it can be appreciated that the subject disclosure is not so limited and that most any number of applications can be employed for data bundling and/or detecting when fast dormancy can be disabled.

In one example, at the end of data flow transmission of the second data session of APP 2 (at $t_0$), fast dormancy would be typically triggered by FD component 406. In one aspect, if the AP engine 402 predicts a high likelihood of a second data session of APP1 coming in within 'Delay 1' seconds by employing profiling function P( ) and if the fast dormancy timer<delay 1<Sum (DCH_to_FACH timer, FACH_to_IDLE timer), then the AP engine 402 can notify the FD component 406 to hold off FD and allow the network timers to continue the state transition process. Accordingly, UE can avoid re-establishing a new RRC connection for the second data session of APP1.

In another example, consider a scenario wherein APP1 and APP2 are classified by the AP engine 402 as "delay tolerant" applications. When the fourth data flow request of APP1 is received (at $t_1$), the AP engine 402 can predict that another data flow request, for example, the fifth data flow request of APP2 will be initiated within a short delay. Typically, the AP engine 402 can also forecast the amount of delay (e.g., 'Delay 2') and notify the DB component 404 to hold off sending the fourth data flow request of APP1 and wait for forecasted delay (e.g., 'Delay 2'). According to one aspect, if the fifth data flow request of APP2 is not initiated before 'Delay 2' expires, the AP engine 402 can notify the DB component 404 to release the hold and allow the fourth data flow request of APP1 to be sent/received. Alternately, when the fifth data flow request of APP2 is initiated within the 'Delay 2', the DB component 404 can bundle the fourth data flow request of APP1 and the fifth data flow request of APP2, and transmit the data flows together. In another example scenario, wherein APP3 is profiled by the AP engine 402 as "low delay tolerant" and/or "high awareness" application (e.g., such as web browsing application, mapping application, gaming application, etc.), a delay will not be applied (e.g., by the DB component 404) for any data flow request to/from APP3.

Figure 8:
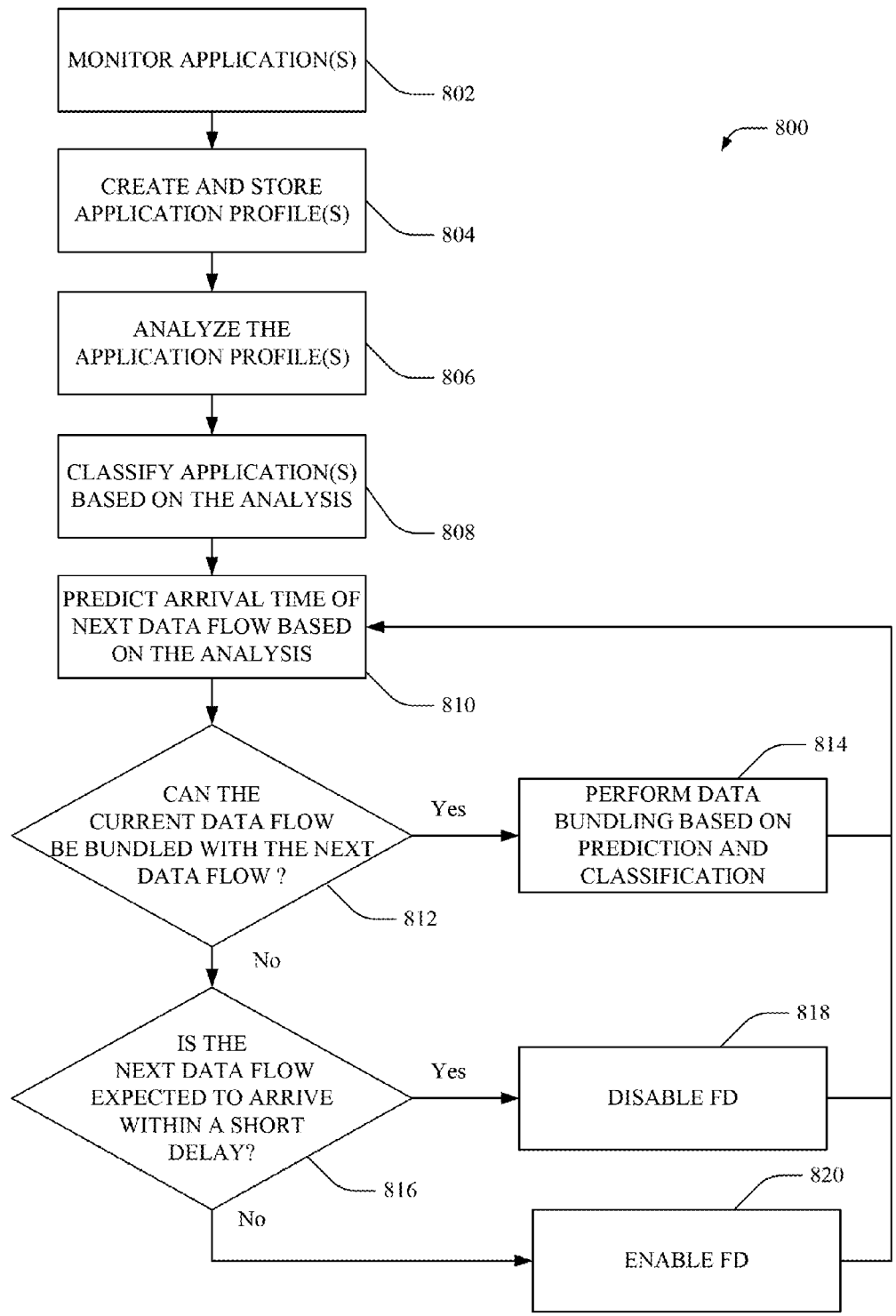
FIG. 8 illustrates an example methodology that can be utilized to facilitate data bundling and fast dormancy based on application monitoring.
Figure 9:
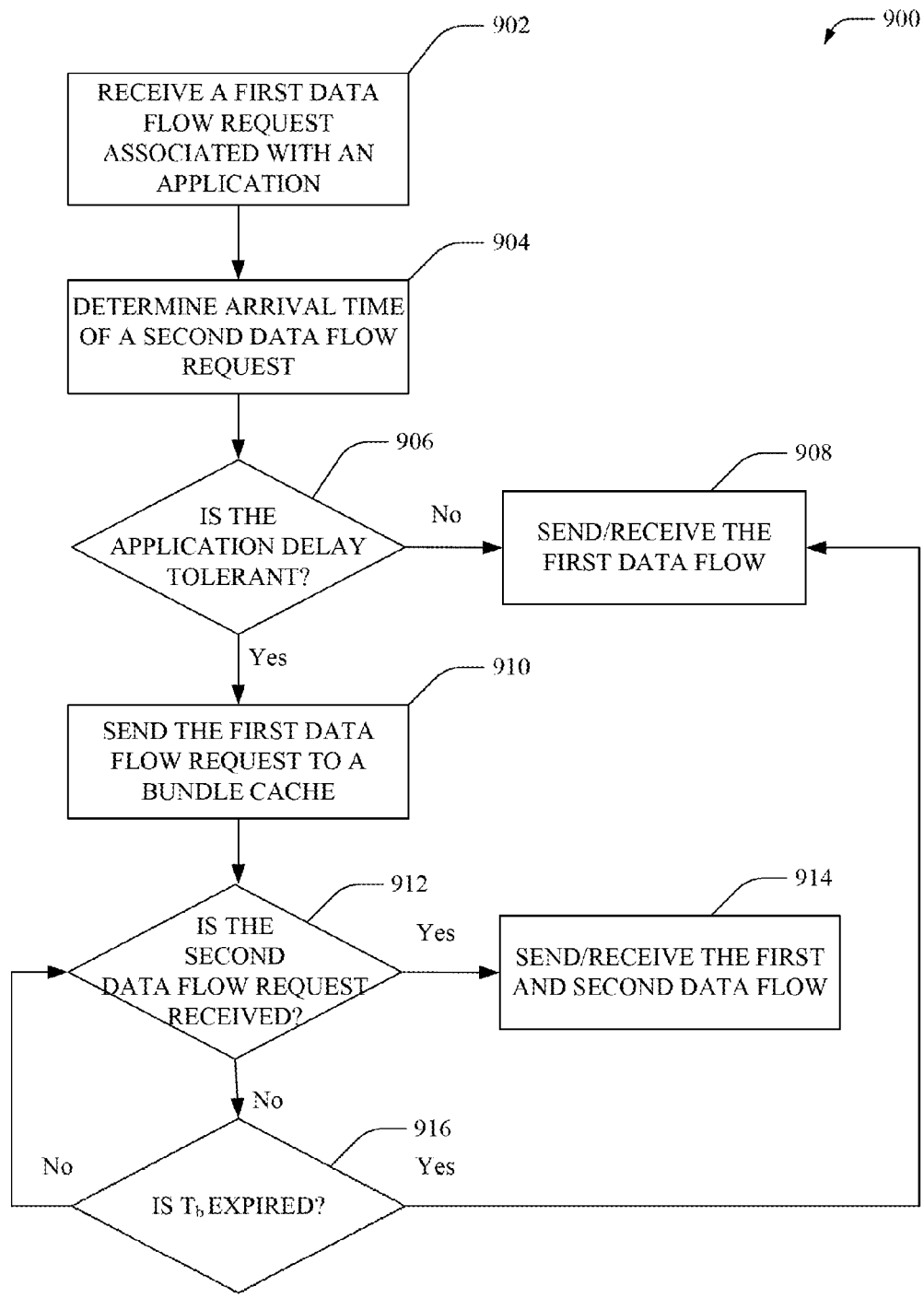
FIG. 9 illustrates an example methodology that facilitates data bundling of data flows from different applications to reduce network signaling.
Figure 10:
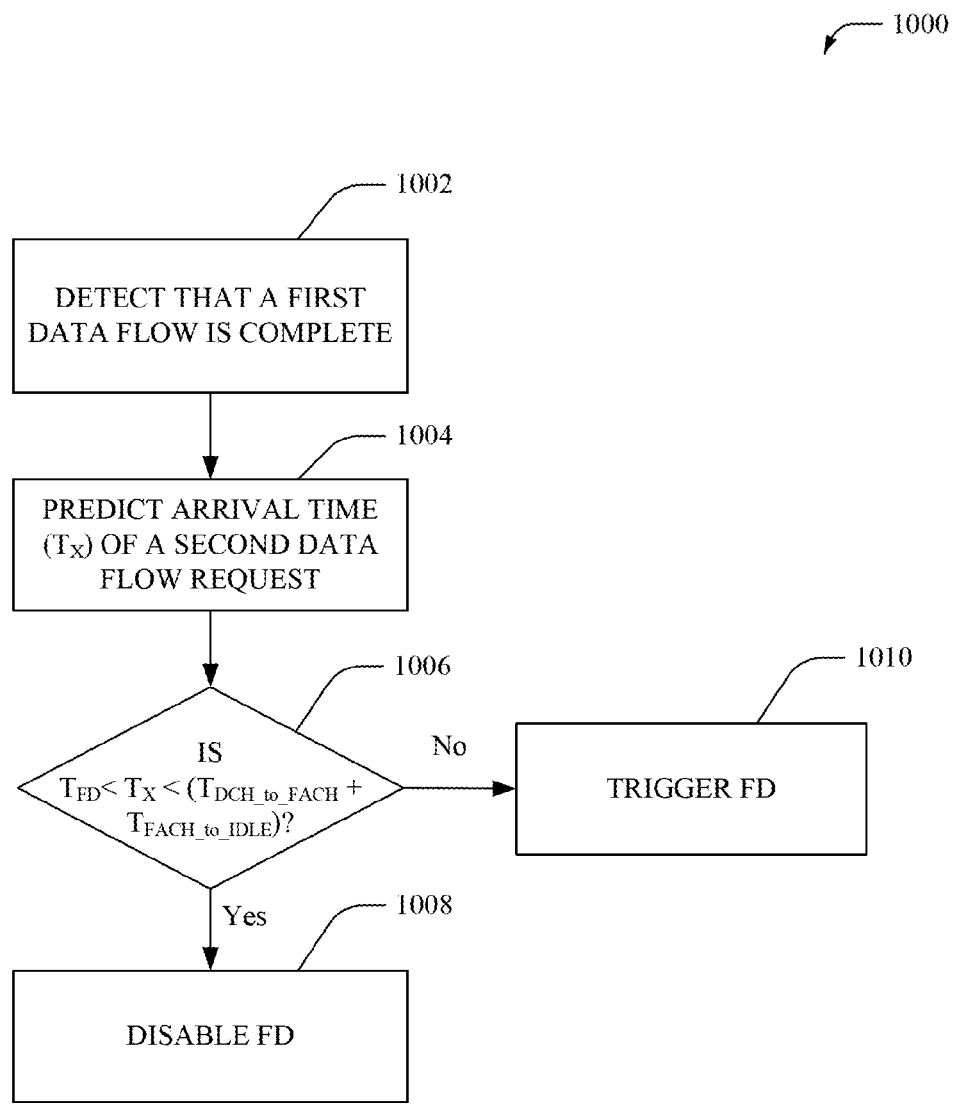
FIG. 10 illustrates an example methodology that overrides a fast dormancy mechanism based on application learning.

FIGS. 8-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

Referring now to FIG. 8, illustrated is an example methodology 800 that can be utilized to facilitate data bundling and FD control, based on application learning, according to an aspect of the subject disclosure. Typically, methodology 800 can be performed by a UE, such as, but not limited to, a cellular phone, a laptop, a tablet, a PC, a PDA, a netbook, a gaming module, a media player, a media recorder, a media viewer, etc. Moreover, one or more applications can be utilized by the UE. For example, the applications can be installed on the UE during manufacture and/or downloaded/installed at any other time (e.g., by a user, service provider, etc.) from an online app store and/or other software distribution platform.

At 802, the applications, for example installed/downloaded on the UE, can be monitored. Moreover, the characteristics of the applications can be observed and histograms and/or other statistical/historical data analysis tools can be generated for various profile keys associated with the applications, such as, but not limited to, inter-packet arrival time, frequency of use, packet size, session duration, delay tolerance level etc. Typically, the more a given application is used, more the application activity/behavior can be monitored and more accurate the "learning" and "profiling" for such application will be. At 804, an application profile can be created and stored for each application. According to an aspect, the application profile includes the profile keys identified for the application.

Further, at 806, the application profiles can be analyzed. Furthermore, at 808, the applications can be classified based on the analysis. For example, the applications can be classified as "random," "delay tolerant," and/or "not delay tolerant." In addition, at 810, the arrival time of a next data flow can be predicted based on the analysis. At 812, it can be determined whether the current data flow can be bundled with the next data flow. In an aspect, the classification of the current data flow can be utilized for the determination. For example, if the current data flow is "random," and/or "not delay tolerant," it can be determined that bundling cannot be performed. However, if the current data flow is "delay tolerant" it can be determined that bundling can be performed. Accordingly, if determined that bundling can be performed, then at 814, data bundling can be performed, based on the prediction and/or classification.

Typically, after the current data flow is completed, at 816, it can be determined whether the next data flow is expected to arrive within a short delay. As an example, the short delay value can be predefined and/or dynamically adjusted and can typically lie between the FD timer expiration value and the sum of the $T_{DCH\_to\_FACH}$ and $T_{FACH\_to\_IDLE}$ timer expiration values. If the next data flow is expected to arrive within the short delay, then at 818, FD can be disabled. Alternately, if the next data flow is not expected to arrive within the short delay, then at 820, FD is enabled and can operate normally.

FIG. 9 illustrates an example methodology 900 that facilitates data bundling of data flows from different applications to reduce network signaling in accordance with an aspect of the subject specification. UEs enable users to download and utilize multiple data applications in the same device, but each application operates independently from the communication network perspective. Methodology 900 provides automated intelligence to bundle closely spaced data payloads from different applications, such that, data packets from different applications can be stacked and sent in one single connection, instead of sending each data packet individually over different connections. As a result, the amount of signaling events can be substantially reduced, leading to a decrease in RNC processing load.

At 902, a first data flow request associated with an application is received. At 904, an arrival time of a second data flow request can be determined. It can be appreciated that the second data flow request can be initiated by the same application or a disparate application. Moreover, the arrival time of the second data flow request can be predicted based on an analysis of profile data associated with the applications. Typically, profile data can include historical information and/or application/UE behavior characteristics relating to data flows. In addition the profile data can also be employed to classify (e.g., random, delay tolerant, not delay tolerant, etc.) the application associated with the first data flow request.

According to an embodiment, at 906, it can be determined whether the application associated with the first data flow request is delay tolerant, for example, based on the classification. If determined that the application is not delay tolerant, then at 908, the first data flow can be sent/received without data bundling. In contrast, if determined that the application is delay tolerant, then at 910, the first data flow request can be sent to (and stored within) a bundle cache. Moreover, at 912, it can be identified whether the second data flow request has been received. At 914, the first and second data flows can be sent/received together, if the second data flow request has been received. If not, at 916, it can be determined whether a bundle timer $T_b$ has expired. If $T_b$ has not expired, the methodology can wait for the second data flow request, as shown at 912, else, if $T_b$ has expired, the first data flow can be sent/received, as shown at 908. It can be appreciated that although methodology 900 illustrates an example scenario wherein two data flow requests can be bundled, it can be appreciated that the subject disclosure is not so limited, and that most any number of data flow requests can be bundled together.

FIG. 10 illustrates an example methodology 1000 that overrides a FD mechanism based on application learning, according to an aspect of the subject innovation. Moreover, methodology 1000 employs historical and statistical based prediction, to determine whether FD can be temporarily delayed to reduce signaling load. Specifically, by temporarily delaying/disabling FD, unnecessary and pre-mature data connection releases (and corresponding new data connection setups) can be prevented, resulting in reduced signaling load on RNC and improved user perceived latency.

At 1002, completion of a first data flow can be detected. Typically, once the data flow is completed, multiple inactivity timers ($T_{DCH\_to\_FACH}$, $T_{FACH\_to\_IDLE}$) are initiated by the RNC, upon expiration of which the UE transitions from DCH to FACH and FACH to IDLE state. In addition, the UE can initiate a FD timer ($T_{FD}$) to initiate direct transition from DCH to IDLE or FACH to IDLE, before the network inactivity timers expire. At 1004, an arrival time ($T_x$) of a second data flow request can be predicted. For example, application behavior can be monitored and/or tracked to generate profile keys, which can be analyzed to facilitate the prediction. At 1006, it can be determine whether the second data flow request is likely to arrive after the expiration of the FD timer ($T_{FD}$), but before the expiration of the network inactivity timers($T_{DCH\_to\_FACH}$, or $T_{FACH\_to\_IDLE}$). In one example, a high likelihood can be obtained by comparing a calculated probability value to a threshold. If the probability is lower than the threshold, the likelihood can be determined as low likelihood; else, it can be determined as high likelihood. Accordingly, if $T_{FD} < T_x < (T_{DCH\_to\_FACH} + T_{FACH\_to\_IDLE})$, then at 1008, FD can be disabled (or delayed). However, if $T_{FD} < T_x < (T_{DCH\_to\_FACH} + T_{FACH\_to\_IDLE})$ does not hold true, then at 1010, FD can be triggered to transition the UE to IDLE state.

Figure 11:
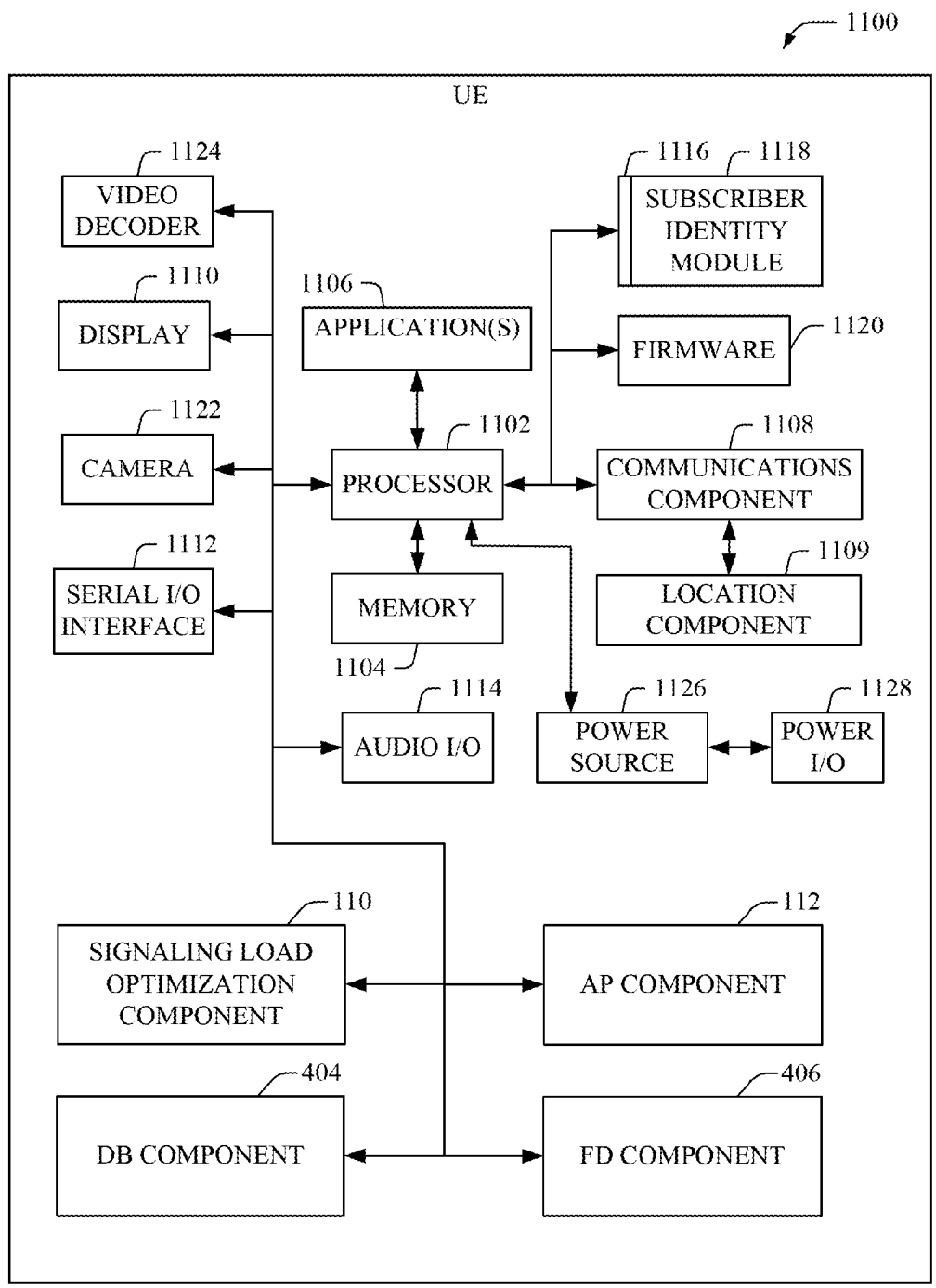
FIG. 11 illustrates a block diagram of a UE suitable for data bundling and controlling fast dormancy based on application characterization in accordance with the innovation.

Referring now to FIG. 11, there is illustrated a block diagram of a UE 1100 suitable for reducing RNC load, based on application profiling, in accordance with the innovation. The UE 1100 can include a processor 1102 for controlling all onboard operations and processes. A memory 1104 can interface to the processor 1102 for storage of data and one or more applications 1106 (e.g., applications 202) being executed by the processor 1102. A communications component 1108 can interface to the processor 1102 to facilitate wired/wireless communication with external systems (e.g., femtocell and macro cell). The communications component 1108 interfaces to a location component 1109 (e.g., GPS transceiver) that can facilitate location detection of the UE 1100. Note that the location component 1109 can also be included as part of the communications component 1108.

The UE 1100 can include a display 1110 for displaying content downloaded and/or for displaying text information related to operating and using the device features. A serial I/O interface 1112 is provided in communication with the processor 1102 to facilitate serial communication (e.g., USB, and/or IEEE 1394) via a hardwire connection. Audio capabilities are provided with an audio I/O component 1114, which can include a speaker for the output of audio signals related to, for example, recorded data or telephony voice data, and a microphone for inputting voice signals for recording and/or telephone conversations.

The device 1100 can include a slot interface 1116 for accommodating a subscriber identity module (SIM) 1118. Firmware 1120 is also provided to store and provide to the processor 1102 startup and operational data. The UE 1100 can also include an image capture component 1122 such as a camera and/or a video decoder 1124 for decoding encoded multimedia content. The UE 1100 can also include a power source 1126 in the form of batteries, which power source 1126 interfaces to an external power system or charging equipment via a power I/O component 1128. In addition, the UE 1100 can be substantially similar to and include functionality associated with UE 102 described supra. Moreover, UE 1100 can include a signaling load optimization component 110, AP component 112, DB component 404, and FD component 406, which can include respective functionality, as more fully described herein, for example, with regard to systems 100, 200, and 400-600.

Figure 12:
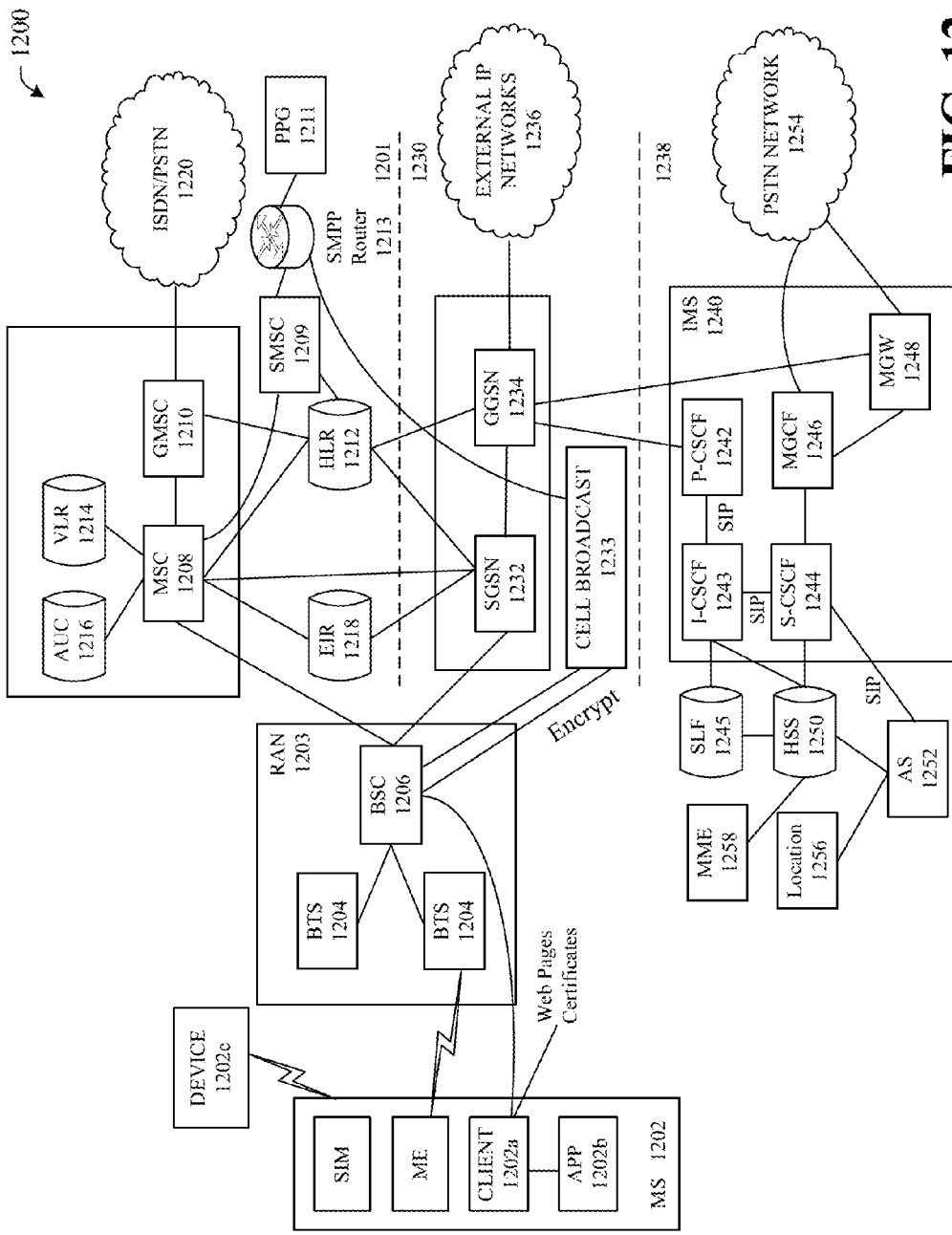
FIG. 12 illustrates a Global System for Mobile Communications (GSM)/General Packet Radio Service (GPRS)/Internet protocol (IP) multimedia network architecture that can employ the disclosed architecture.

Now turning to FIG. 12, such figure depicts an example GSM/GPRS/IP multimedia network architecture 1200 that can employ the disclosed communication architecture. In particular, the GSM/GPRS/IP multimedia network architecture 1200 includes a GSM core network 1201, a GPRS network 1230 and an IP multimedia network 1238. The GSM core network 1201 includes a Mobile Station (MS) 1202, at least one Base Transceiver Station (BTS) 1204 and a Base Station Controller (BSC) 1206. The MS 1202 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1202 includes an embedded client 1202a that receives and processes messages received by the MS 1202. The embedded client 1202a can be implemented in JAVA and is discuss more fully below. It can be appreciated that MS 1202 can be substantially similar to UE 102 and include functionality described with respect to UE 102 in systems 100, 200, and 400-600.

The embedded client 1202a communicates with an application 1202b (e.g., application(s) 202) that provides services and/or information to an end user. Additionally or alternately, the MS 1202 and a device 1202c can be enabled to communicate via a short-range wireless communication link, such as BLUETOOTH®. As one of ordinary skill in the art would recognize, there can be an endless number of devices 1202c that use the SIM within the MS 1202 to provide services, information, data, audio, video, etc. to end users.

The BTS 1204 is physical equipment, such as a radio tower, that enables a radio interface to communicate with the MS 1202. Each BTS can serve more than one MS. The BSC 1206 manages radio resources, including the BTS. The BSC 1206 can be connected to several BTSs. The BSC and BTS components, in combination, are generally referred to as a base station (BSS) or radio access network (RAN) 1203.

The GSM core network 1201 also includes a Mobile Switching Center (MSC) 1208, a Gateway Mobile Switching Center (GMSC) 1210, a Home Location Register (HLR) 1212, Visitor Location Register (VLR) 1214, an Authentication Center (AuC) 1218, and an Equipment Identity Register (EIR) 1218. The MSC 1208 performs a switching function for the network. The MSC also performs other functions, such as registration, authentication, location updating, handovers, and call routing. The GMSC 1210 provides a gateway between the GSM network and other networks, such as an Integrated Services Digital Network (ISDN) or Public Switched Telephone Networks (PSTNs) 1220. In other words, the GMSC 1210 provides interworking functionality with external networks.

The HLR 1212 is a database or component(s) that comprises administrative information regarding each subscriber registered in a corresponding GSM network. The HLR 1212 also includes the current location of each MS. The VLR 1214 is a database or component(s) that contains selected administrative information from the HLR 1212. The VLR contains information necessary for call control and provision of subscribed services for each MS currently located in a geographical area controlled by the VLR. The HLR 1212 and the VLR 1214, together with the MSC 1208, provide the call routing and roaming capabilities of GSM. The AuC 1216 provides the parameters needed for authentication and encryption functions. Such parameters allow verification of a subscriber's identity. The EIR 1218 stores security-sensitive information about the mobile equipment.

A Short Message Service Center (SMSC) 1209 allows one-to-one Short Message Service (SMS) messages to be sent to/from the MS 1202. A Push Proxy Gateway (PPG) 1211 is used to "push" (e.g., send without a synchronous request) content to the MS 1202. The PPG 1211 acts as a proxy between wired and wireless networks to facilitate pushing of data to the MS 1202. A Short Message Peer to Peer (SMPP) protocol router 1213 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1202 sends a location update including its current location information to the MSC/VLR, via the BTS 1204 and the BSC 1206. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1230 is logically implemented on the GSM core network architecture by introducing two packet-switching network nodes, a serving GPRS support node (SGSN) 1232, a cell broadcast and a Gateway GPRS support node (GGSN) 1234. The SGSN 1232 is at the same hierarchical level as the MSC 1208 in the GSM network. The SGSN controls the connection between the GPRS network and the MS 1202. The SGSN also keeps track of individual MS's locations, security functions, and access controls.

A Cell Broadcast Center (CBC) 1233 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1234 provides a gateway between the GPRS network and a public packet network (PDN) or other IP networks 1236. That is, the GGSN provides interworking functionality with external networks, and sets up a logical link to the MS through the SGSN. When packet-switched data leaves the GPRS network, it is transferred to an external TCP-IP network 1236, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN. In a GSM/GPRS network, GPRS services and GSM services can be used in parallel. A GPRS network 1230 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network.

The IP multimedia network 1238 was introduced with 3GPP Release 5, and includes an IP multimedia subsystem (IMS) 1240 to provide rich multimedia services to end users. A representative set of the network entities within the IMS 1240 are a call/session control function (CSCF), a media gateway control function (MGCF) 1246, a media gateway (MGW) 1248, and a master subscriber database, called a home subscriber server (HSS) 1250. The HSS 1250 can be common to the GSM network 1201, the GPRS network 1230 as well as the IP multimedia network 1238.

The IP multimedia system 1240 is built around the call/session control function, of which there are three types: an interrogating CSCF (I-CSCF) 1243, a proxy CSCF (P-CSCF) 1242, and a serving CSCF (S-CSCF) 1244. The P-CSCF 1242 is the MS's first point of contact with the IMS 1240. The P-CSCF 1242 forwards session initiation protocol (SIP) messages received from the MS to an SIP server in a home network (and vice versa) of the MS. The P-CSCF 1242 can also modify an outgoing request according to a set of rules defined by the network operator (for example, address analysis and potential modification).

The I-CSCF 1243 forms an entrance to a home network and hides the inner topology of the home network from other networks and provides flexibility for selecting an S-CSCF. The I-CSCF 1243 can contact a subscriber location function (SLF) 1245 to determine which HSS 1250 to use for the particular subscriber, if multiple HSS's 1250 are present. The S-CSCF 1244 performs the session control services for the MS 1202. This includes routing originating sessions to external networks and routing terminating sessions to visited networks. The S-CSCF 1244 also decides whether an application server (AS) 1252 is required to receive information on an incoming SIP session request to ensure appropriate service handling. This decision is based on information received from the HSS 1250 (or other sources, such as an application server 1252). The AS 1252 also communicates to a location server 1256 (e.g., a Gateway Mobile Location Center (GMLC)) that provides a position (e.g., latitude/longitude coordinates) of the MS 1202. The MME 1258 provides authentication of a user by interacting with the HSS 1250 in LTE networks.

The HSS 1250 contains a subscriber profile and keeps track of which core network node is currently handling the subscriber. It also supports subscriber authentication and authorization functions (AAA). In networks with more than one HSS 1250, a subscriber location function provides information on the HSS 1250 that contains the profile of a given subscriber.

The MGCF 1246 provides interworking functionality between SIP session control signaling from the IMS 1240 and ISUP/BICC call control signaling from the external GSTN networks (not shown). It also controls the media gateway (MGW) 1248 that provides user-plane interworking functionality (e.g., converting between AMR- and PCM-coded voice). The MGW 1248 also communicates with a PSTN network 1254 for TDM trunks. In addition, the MGCF 1246 communicates with the PSTN network 1254 for SS7 links.

Figure 13:
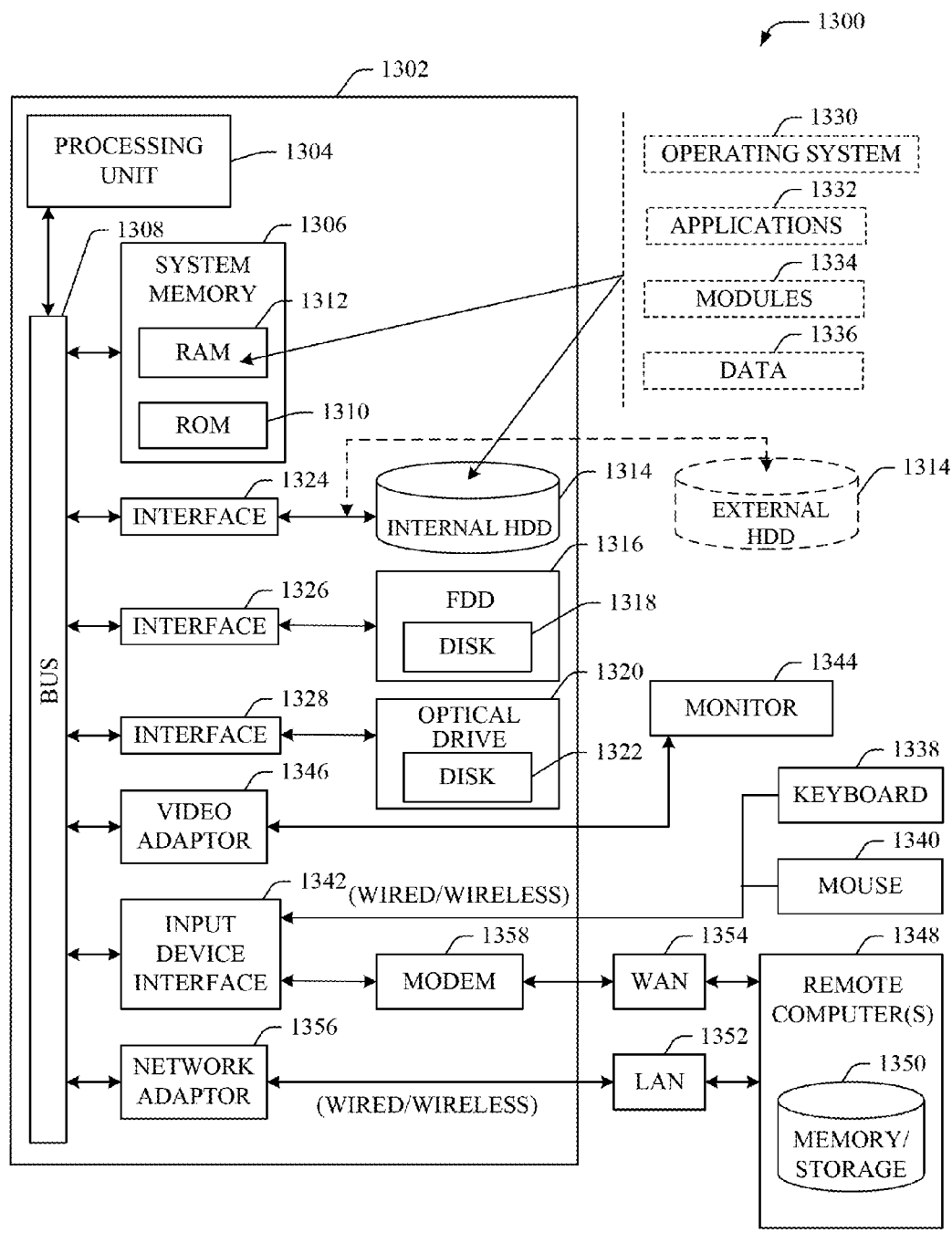
FIG. 13 illustrates a block diagram of a computer operable to execute the disclosed communication architecture.

Referring now to FIG. 13, there is illustrated a block diagram of a computer operable to execute the disclosed communication architecture. In order to provide additional context for various aspects of the subject specification, FIG. 13 and the following discussion are intended to provide a brief, general description of a suitable computing environment 1300 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various aspects of the specification includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the specification can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        based on characteristic data indicative of a characteristic of a first application of a first device that is associated with a first data flow, determining timing data indicative of an arrival time for receiving request data indicative of a request for a second data flow associated with a second application of the first device; and
        in response to determining that the arrival time is within a time period between a first expiration of a first timer implemented by the first device and a second expiration of a second timer implemented by a second device, delaying the first expiration of the first timer, wherein the first timer and the second timer transition the first device to an idle state that facilitates a disconnection of a communication link associated with the first data flow.

2. The system of claim 1, wherein the determining the timing data comprises determining the timing data in response to determining that the first data flow satisfies a defined criterion.

3. The system of claim 1, wherein the time period is a first time period, and wherein the operations further comprise:
    determining the characteristic data by monitoring data flows associated with the first application during a second time period.

4. The system of claim 1, wherein the time period is a first time period, and wherein the operations further comprise:
    determining profile data indicative of profile keys associated with the first application by analyzing data flows associated with the first application during a second time period.

5. The system of claim 1, wherein the time period is a first time period, and wherein the operations further comprise:
    determining profile data indicative of a profile key associated with packetized data for data flows associated with the first application by analyzing the data flows during a second time period.

6. The system of claim 1, wherein the time period is a first time period, and wherein the operations further comprise:
    determining profile data indicative of profile keys that comprise frequency of use data associated with the first application by analyzing data flows associated with the first application during a second time period.

7. The system of claim 1, wherein the operations further comprise:
    in response to determining that the arrival time is not within the time period and that the first timer has expired, facilitating a transition of the first device to the idle state.

8. The system of claim 1, wherein the delaying comprises delaying the first expiration in response to verifying, based on the characteristic data, that the first data flow does not satisfy a defined criterion.

9. The system of claim 1, wherein the timing data is first timing data, the arrival time is a first arrival time, and the request is a first request, and wherein the operations further comprise:
    determining, based on the characteristic data, second timing data indicative of a second arrival time associated with receiving a second request for a third data flow associated with a third application of the first device.

10. The system of claim 9, wherein the operations further comprise:
    in response to determining that the second arrival time satisfies a defined criterion, combining the first data flow with the third data flow.

11. The system of claim 10, wherein the operations further comprise:
    in response to the determining that the second arrival time satisfies the defined criterion, delaying a transmission of information associated with the first data flow until the second request for the third data flow is received.

12. A method, comprising:
    determining, by a system comprising a processor, timing data indicative of an arrival time of a first data flow after completion of a second data flow based on data associated with an application of a first device; and
    based on the timing data, disabling, by the system, a first timer implemented by the first device in response to determining that the arrival time of the first data flow is between a first expiration time of the first timer and a second expiration time of a second timer implemented by a second device, wherein the first timer and the second timer are employable to transition the first device to an idle state that facilitates a disconnection of a connection link for transmitting the second data flow.

13. The method of claim 12, wherein the determining the timing data comprises determining the timing data based on profile data indicative of a behavior profile for the application of the first device.

14. The method of claim 13, further comprising:
monitoring, by the system, a communication between the application and a second device; and
based on the monitoring, determining, by the system, the profile data for the application.

15. The method of claim 12, further comprising:
in response to determining that the arrival time is not between the first expiration time and the second expiration time and determining that the first timer has expired, facilitating, by the system, a transition of the first device to the idle state.

16. The method of claim 12, further comprising:
determining, by the system, payload information indicative of a packet size of a data packet transmitted during a communication between the first device and a third device.

17. The method of claim 12, further comprising:
determining, by the system, frequency of use data indicative of a frequency of use of the data associated with the application.

18. A machine-readable storage medium comprising executable instructions that, when executed by a processor, facilitate performance of operations, comprising:
determining, based on activity data indicative of activities related to a first application for a first device that is associated with a first transmission of first data, timing data for a request for a second transmission of second data associated with a second application for the first device; and
in response to determining based on the timing data that the request is received between a first expiration of a first timer of the first device and a second expiration of a second timer of a second device, delaying the first expiration of the first timer, wherein the first timer and the second timer transition the first device to an idle state that facilitates disconnection of a connection link associated with the first transmission.

19. The machine-readable storage medium of claim 18, wherein the operations further comprise:
in response to determining that the first timer has expired, facilitating a transition of the first device to the idle state.

20. The machine-readable storage medium of claim 18, wherein the operations further comprise:
determining payload information indicative of a packet size of a data packet transmitted between the first application and a third device.

* * * * *